US012567131B2

(12) United States Patent
Kerofsky et al.

(10) Patent No.: US 12,567,131 B2
(45) Date of Patent: Mar. 3, 2026

(54) DYNAMIC COMPOSITE IMAGE GENERATION AND HOLE FILLING

(71) Applicant: QUALCOMM Incorporated, San Diego, CA (US)

(72) Inventors: Louis Joseph Kerofsky, San Diego, CA (US); Kuan-Ting Shen, San Diego, CA (US); Madhumitha Sakthi, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 18/500,901

(22) Filed: Nov. 2, 2023

(65) Prior Publication Data

US 2024/0221132 A1     Jul. 4, 2024

Related U.S. Application Data

(60) Provisional application No. 63/478,245, filed on Jan. 3, 2023.

(51) Int. Cl.

| | |
|---|---|
| *G06T 5/77* | (2024.01) |
| *G06T 5/50* | (2006.01) |
| *G06T 5/70* | (2024.01) |
| *G06T 7/292* | (2017.01) |
| *G06T 7/60* | (2017.01) |
| *H04N 5/265* | (2006.01) |

(52) U.S. Cl.
CPC ................. *G06T 5/77* (2024.01); *G06T 5/50* (2013.01); *G06T 5/70* (2024.01); *G06T 7/292* (2017.01); *G06T 7/60* (2013.01); *H04N 5/265* (2013.01); *G06T 2207/20212* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2007/0223596 A1* | 9/2007 | Fan ........................ | H04N 5/144 348/E5.065 |
| 2016/0261793 A1* | 9/2016 | Sivan ...................... | G06F 3/013 |
| 2019/0026958 A1* | 1/2019 | Gausebeck ............. | G06T 7/579 |
| 2020/0349705 A1* | 11/2020 | Minchenkov ...... | A61C 13/0004 |

* cited by examiner

*Primary Examiner* — Xiaolan Xu
(74) *Attorney, Agent, or Firm* — Norton Rose Fulbright US LLP/QUALCOMM Incorporated

(57) ABSTRACT

This disclosure provides systems, methods, and devices for vehicle driving assistance systems that support image processing. In a first aspect, a method of image processing includes receiving first image data from a first image sensor of a first camera, receiving second image data from a second image sensor of a second camera, wherein a first field of view of the second image data overlaps at least a portion of a second field of view of the first image data, generating, based on the first image data and the second image data, a bird's eye view composite image, detecting one or more holes in the bird's eye view composite image, and filling the one or more holes in the bird's eye view composite image using one or more rays of the first camera. Other aspects and features are also claimed and described.

30 Claims, 16 Drawing Sheets

1150

| Pts on ray | P1 | P2 | P3 | P4 | P5 |
|---|---|---|---|---|---|
| Before | 1.5m | nan | nan | 0.5m | nan |
| After | 1.5m | 1.5m | 1.5m | 0.5m | 0.5m |

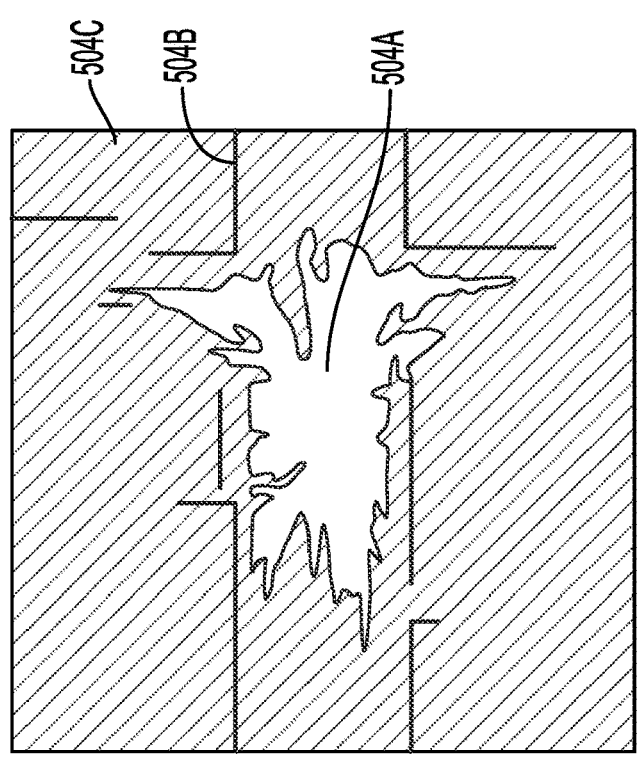
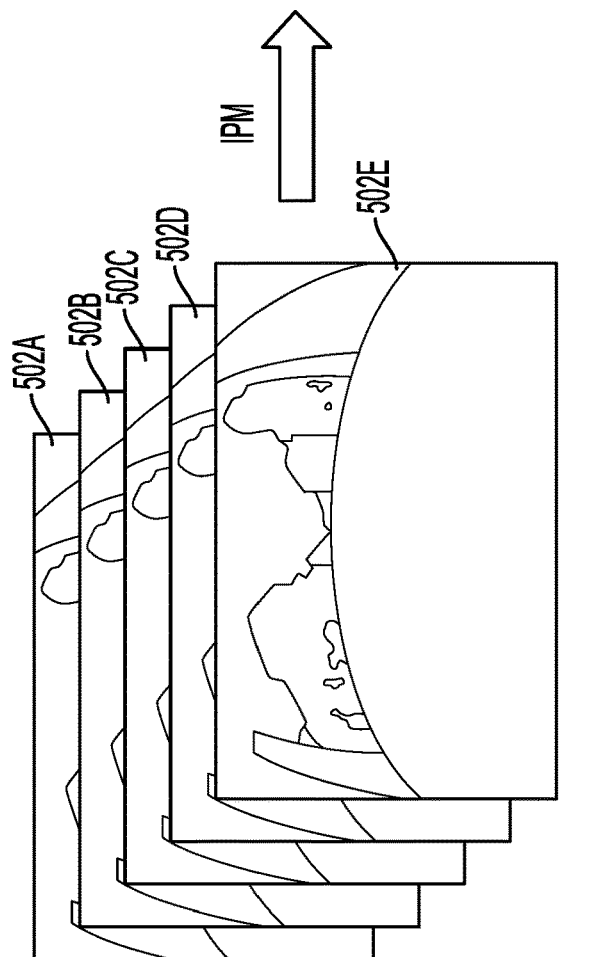
IPM
FIG. 5

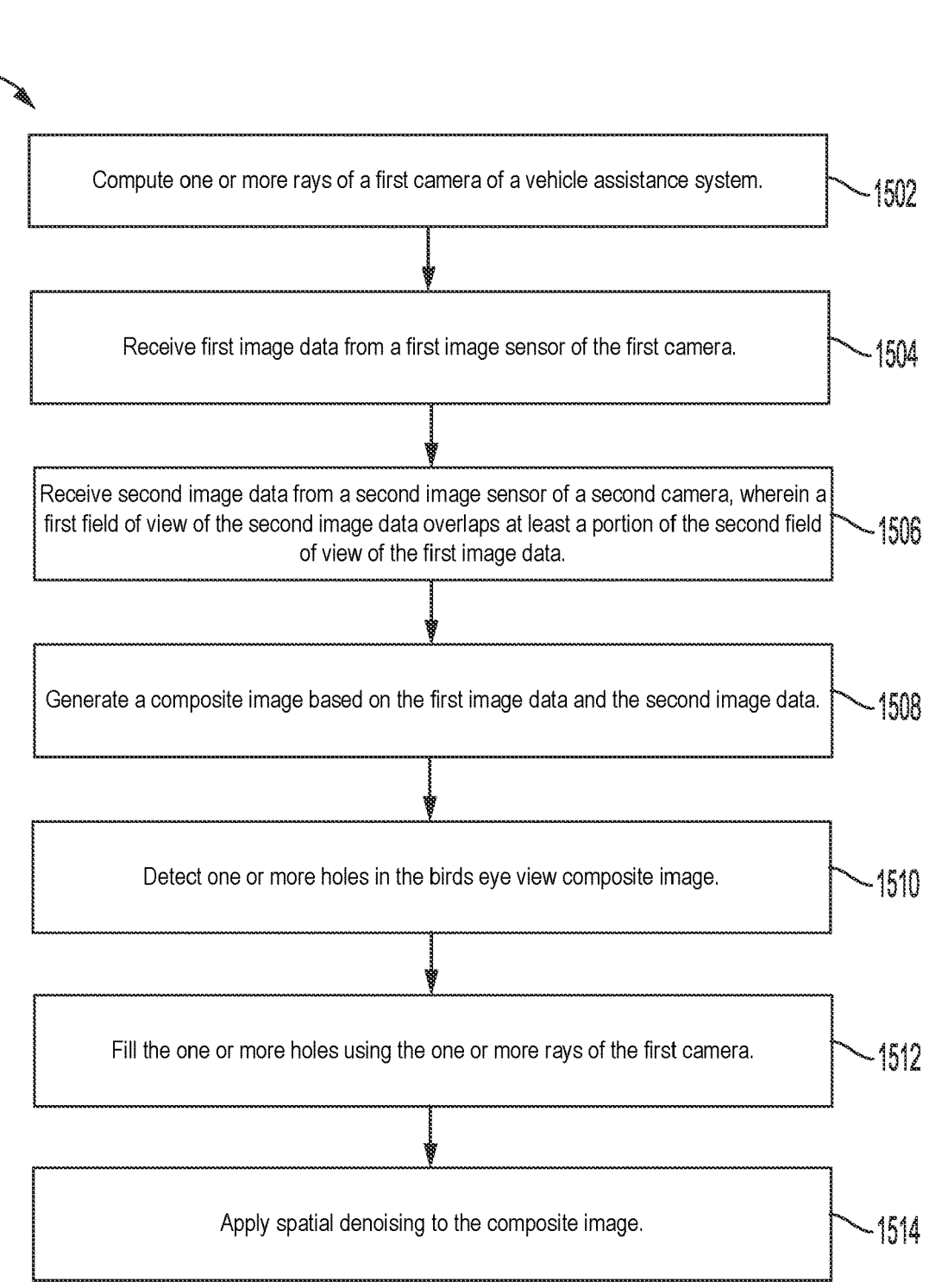

1500

Compute one or more rays of a first camera of a vehicle assistance system. ⟍1502

Receive first image data from a first image sensor of the first camera. ⟍1504

Receive second image data from a second image sensor of a second camera, wherein a first field of view of the second image data overlaps at least a portion of the second field of view of the first image data. ⟍1506

Generate a composite image based on the first image data and the second image data. ⟍1508

Detect one or more holes in the birds eye view composite image. ⟍1510

Fill the one or more holes using the one or more rays of the first camera. ⟍1512

Apply spatial denoising to the composite image. ⟍1514

FIG. 15

DYNAMIC COMPOSITE IMAGE GENERATION AND HOLE FILLING

CROSS-REFERENCE TO RELATED APPLICATIONS

This application claims the benefit of U.S. Provisional Patent Application No. 63/478,245, entitled, "DYNAMIC OPTICAL FLOW AND DEPTH BASED DYNAMIC OCCUPANCY MAP," filed on Jan. 3, 2023, which is expressly incorporated by reference herein in its entirety.

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

Driving assistance systems included in vehicles may include a variety of sensors. Some driving assistance systems may include image sensors and/or cameras for capturing image data related to an environment around or inside a vehicle. For example, cameras of a driving assistance system may be used to capture images of an environment around a vehicle, and such image data may be used for providing driving assistance functions.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road.

Example embodiments provide for generation of dynamic composite image generation and hole filling. For example, a vehicle may include multiple cameras for providing image data to a vehicle assistance system and/or other systems of a vehicle. The multiple cameras may be used to generate a composite image of an environment around the vehicle, such as a bird's eye view (BEV) composite image of the vehicle. In some aspects, the BEV composite image may include height and or motion data regarding a height and or motion of objects around the vehicle. However, when generating a composite image of an environment around a vehicle, holes may be included where image, height, and/or motion data is not present. As one particular example, holes may be generated when inverse projection mapping (IPM) is used to determine heights of objects around a vehicle for a height map of the composite image. Such holes may be filled using rays computed for one or more cameras, such as cameras providing image data to the vehicle assistance system. For example, such rays may be used to determine attributes of nearby objects, allowing for holes in the composite image, such as holes corresponding to missing height or motion data, to be filled in using height or motion data of locations near the hole along one or more computed rays. Thus, a more accurate composite image, which may include height and/or motion information, may be generated through filling of holes using rays calculated for one or more of the cameras from which the image data was received.

In one aspect of the disclosure, a method for image processing for use in a driving assistance system includes receiving first image data from a first image sensor of a first camera, receiving second image data from a second image sensor of a second camera, wherein a first field of view of the second image data overlaps at least a portion of a second field of view of the first image data, generating, based on the first image data and the second image data, a composite image, detecting one or more holes in the composite image, and filling the one or more holes in the composite image using one or more rays of the first camera.

In an additional aspect of the disclosure, an apparatus includes a memory storing processor-readable code and one or more processors coupled to the memory. The one or more processors are configured to execute the processor-readable code to cause the one or more processors to perform operations including receiving first image data from a first image sensor of a first camera, receiving second image data from a second image sensor of a second camera, wherein a first field of view of the second image data overlaps at least a portion of a second field of view of the first image data, generating, based on the first image data and the second image data, a composite image, detecting one or more holes in the composite image, and filling the one or more holes in the composite image using one or more rays of the first camera. In some aspects of the disclosure, the apparatus may be a vehicle further including a first camera and a second camera, and the one or more processors may be coupled to the first camera and the second camera.

In an additional aspect of the disclosure, an apparatus includes means for receiving first image data from a first image sensor of a first camera, means for receiving second image data from a second image sensor of a second camera, wherein a first field of view of the second image data overlaps at least a portion of a second field of view of the first image data, means for generating, based on the first image data and the second image data, a composite image, means for detecting one or more holes in the composite image, and means for filling the one or more holes in the composite image using one or more rays of the first camera.

In an additional aspect of the disclosure, a non-transitory computer-readable medium stores instructions that, when executed by a processor, cause the processor to perform operations. The operations include receiving first image data from a first image sensor of a first camera, receiving second image data from a second image sensor of a second camera, wherein a first field of view of the second image data overlaps at least a portion of a second field of view of the first image data, generating, based on the first image data and the second image data, a composite image, detecting one or more holes in the composite image, and filling the one or more holes in the composite image using one or more rays of the first camera.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A. B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a side-by-side view of a plurality of images and a height map of a composite image according to some embodiments of this disclosure.

FIG. 15 is a flow chart illustrating an example method for dynamic composite image generation and hole filling according to some embodiments of this disclosure.

Like reference numbers and designations in the various drawings indicate like elements.

DETAILED DESCRIPTION

Figure 1:
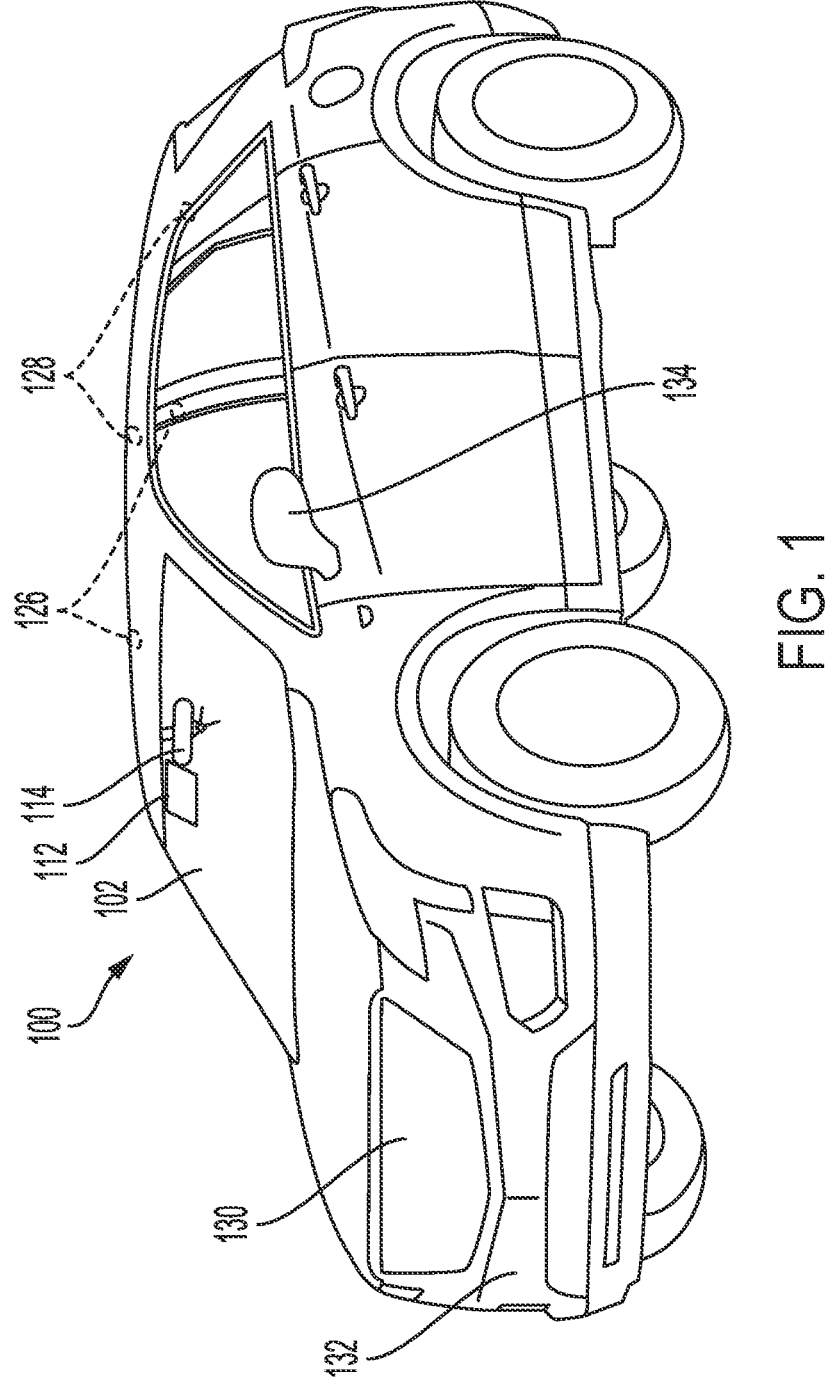
FIG. 1 is a perspective view of a motor vehicle with a driver monitoring system according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a dynamic composite image generation and hole filling. Image data may be received from multiple cameras of a vehicle assistance system, showing different perspective views of an environment around a vehicle. For example, such cameras, which may include conventional cameras and wide-angle fisheye cameras, and other sensors, such as radar sensors and lidar sensors, may provide 360 degree coverage of an environment around the vehicle. Such image data may be used to generate a composite image, such as a bird's eye view composite image, of the environment around the vehicle. The image data, and other sensor data, may also be used to determine heights of objects detected in the environment around the vehicle and/or motion of objects detected in the environment around the vehicle. The bird's eye view format may allow for height, motion, and other information to be included in the composite image. In particular, generation of such a composite image may allow for representation of various sensor responses and spatial relations useful in showing an environment around the vehicle. A bird's eye view composite image may be used for a variety of purposes such as assisted parking, lane departure detection and assistance, obstacle detection, and other purposes. One challenge in generating a bird's eye view composite is mapping various image and motion information into a bird's eye view representation. As one particular example, height data, such as distance data between a camera and one or more detected objects may be used to generate a height map of a bird's eye view composite. For example, such a height map may indicate the height of points detected above a given 2D spatial location, when viewed from above. In addition to a height map, a bird's eye view composite may include a motion map, which may indicate motion of one or more objects shown in a bird's eye view composite. Such a motion map may allow for generation of a dynamic occupancy map, representing both presence at the current time and prediction of future positions useful for path planning, collision avoidance, and other applications.

Use of image data from various cameras and other data from other sensors of a driving assistance system to generate a composite image, such as a bird's eye view composite image, may result in inclusion of holes and noise in the composite images. For example, deficiencies in data received from cameras and other sensors may result in portions of the composite image for which data is not present regarding height, motion, or other characteristics of an environment. Such holes may be caused by occlusions, finite angular precision in imagery, finite depth precision in depth maps, such as precision issues caused by radar, lidar, or cameras, and other causes. Poor scene reconstruction due to holes may inhibit path planning and obstacle avoidance.

The presence of holes in a composite image, such as a bird's eye view composite image, may be addressed by filling the holes using one or more rays of a first camera to estimate height, motion, or other information not present for detected holes. That is, information regarding nearby heights, motions, and/or other parameters along rays from one or more cameras may be used to fill in holes in height, motion, and other information that is not present in a dataset used to generate the composite image. Furthermore, such rays may be used for enhanced inclusion of motion information in a bird's eye view composite image to capture scene dynamics in addition to static cell occupancy, as may be present in a static height map.

Particular implementations of the subject matter described in this disclosure may be implemented to realize one or more of the following potential advantages or benefits. In some aspects, the present disclosure provides techniques for image processing that may be particularly beneficial in smart vehicle applications. For example, filling of holes in a composite image may enable presentation of an occupancy grid to the driver, and inclusion of motion information can assist in path planning and prediction of future object locations. Filling of holes in a composite image, such as a bird's eye view composite image, may allow for more accurate detection of objects in an environment around a vehicle for use by a user in analyzing an environment around the vehicle, such as when the composite image is displayed on a display of the vehicle, or for use by a driving assistance system in providing assisted or autonomous driving functions.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof. The array of cameras mounted around the vehicle 100 may, for example, be used to capture image data of an environment around the vehicle, which may, along with data from other sensors of the vehicle, such as radar and lidar sensors, be used to generate a composite image, such as a bird's eye view image, of an environment surrounding the vehicle 100, as described herein.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
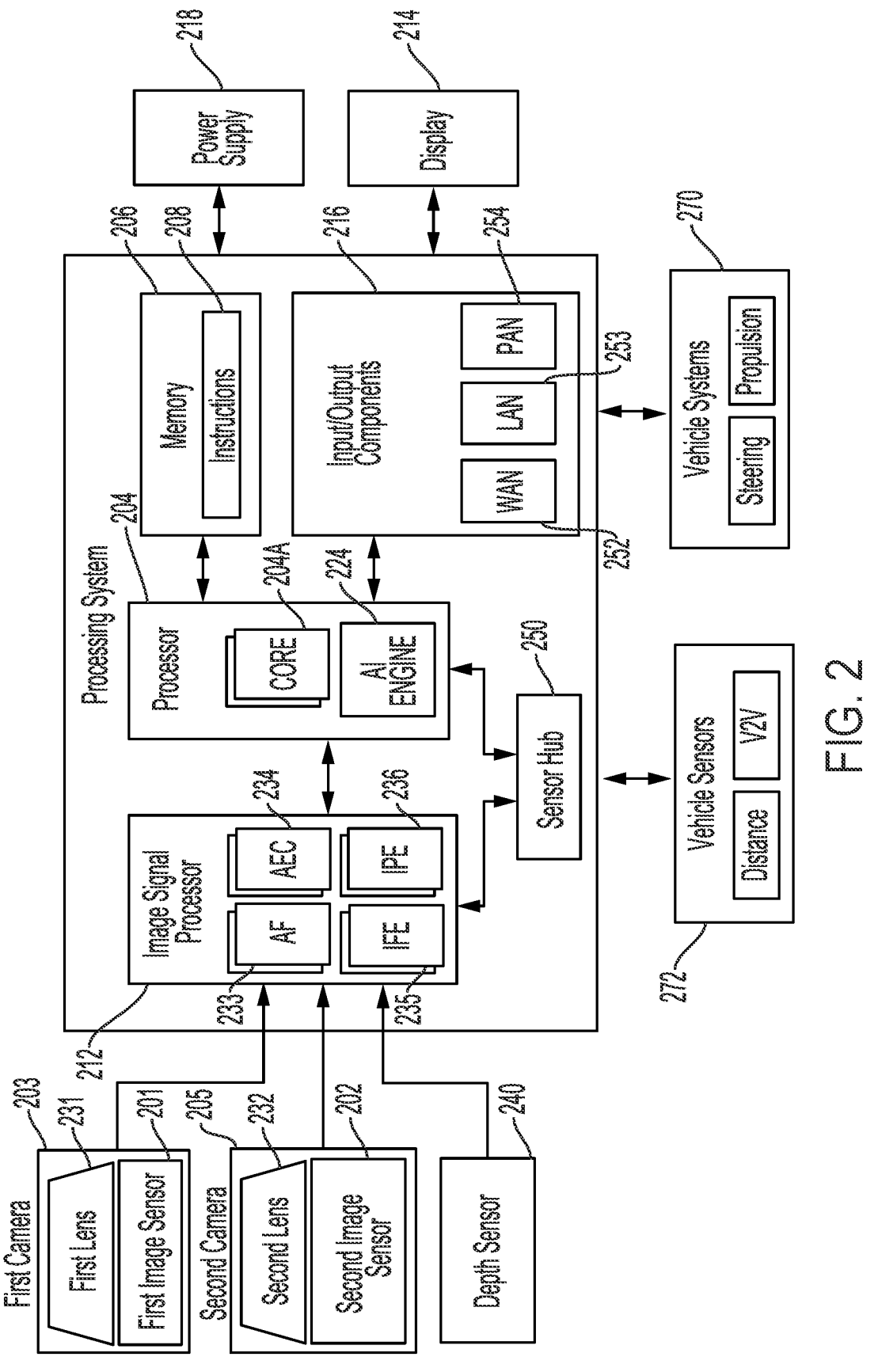
FIG. 2 shows a block diagram of an example image processing configuration for a vehicle according to some embodiments of this disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100. The processor 204, the image signal processor 212, or both, may use information from the first camera 203, the second camera 205, the depth sensor 240, the vehicle sensors 272, and other sensors to generate a composite image, such as a bird's eye view composite image, of an environment surrounding a vehicle including height and/or motion information, with hole filling as described herein. The bird's eye view composite image may be displayed on display 214 for a driver of a vehicle and/or used to inform control of one or more vehicle systems 270, such as in assisted or autonomous driving systems.

Figure 3:
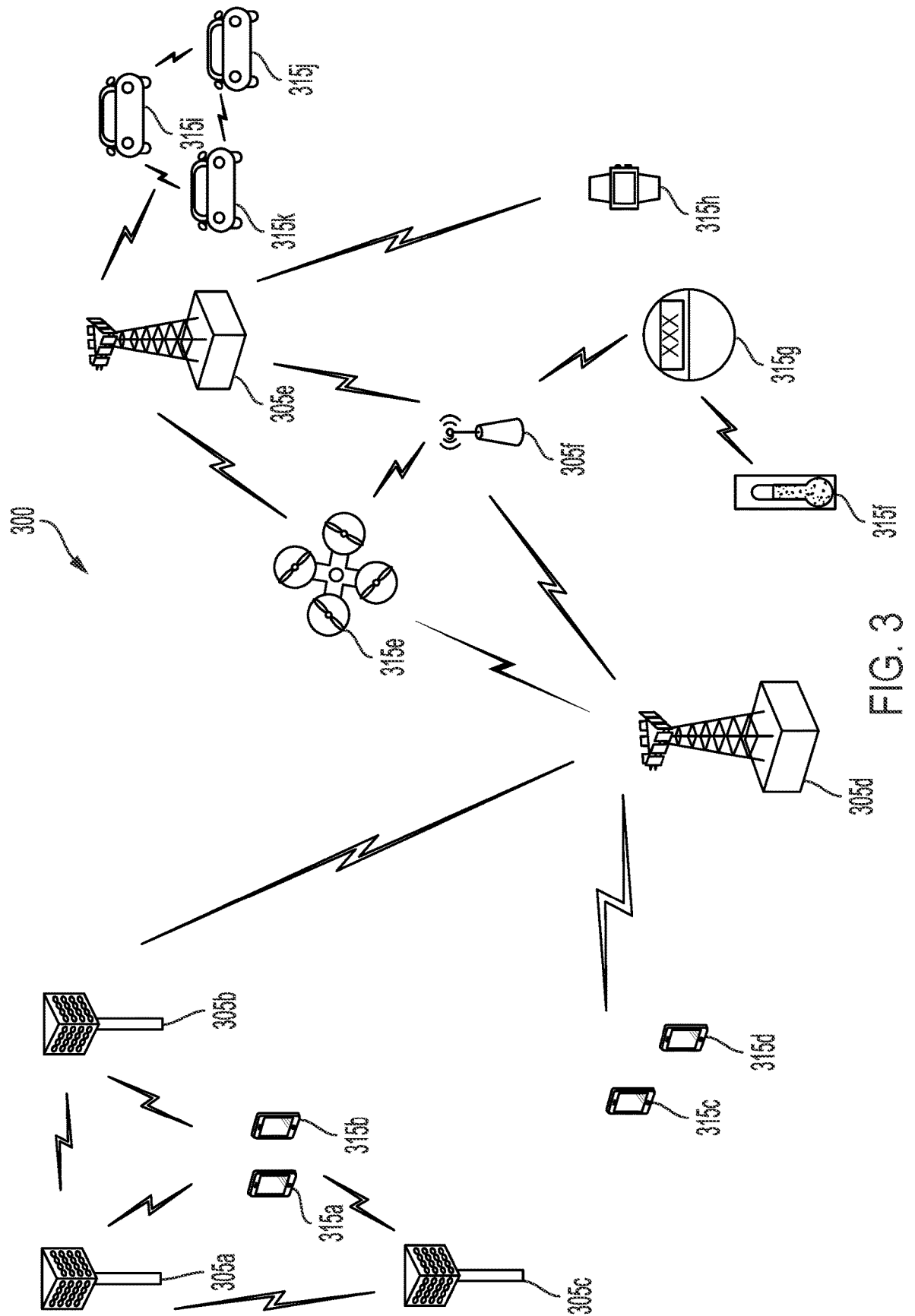
FIG. 3 is a block diagram illustrating details of an example wireless communication system according to some embodiments of this disclosure.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*c*.

Aspects of the vehicular systems described with reference to, and shown in, FIG. 1, FIG. 2, and FIG. 3 may include a system for dynamic composite image generation and hole filling. Holes of a composite image, such as a bird's eye view composite image, generated using image data from first and second cameras may be filled using one or more rays of a first camera. For example, such holes may be holes in a height map of the bird's eye view composite image or holes of a motion map of the bird's eye view composite image. Such hole filling may include propagation of known height, motion, or other values from adjacent portions of a bird's eye view composite image using one or more rays of one or more cameras used to generate the bird's eye view composite.

Figure 4:
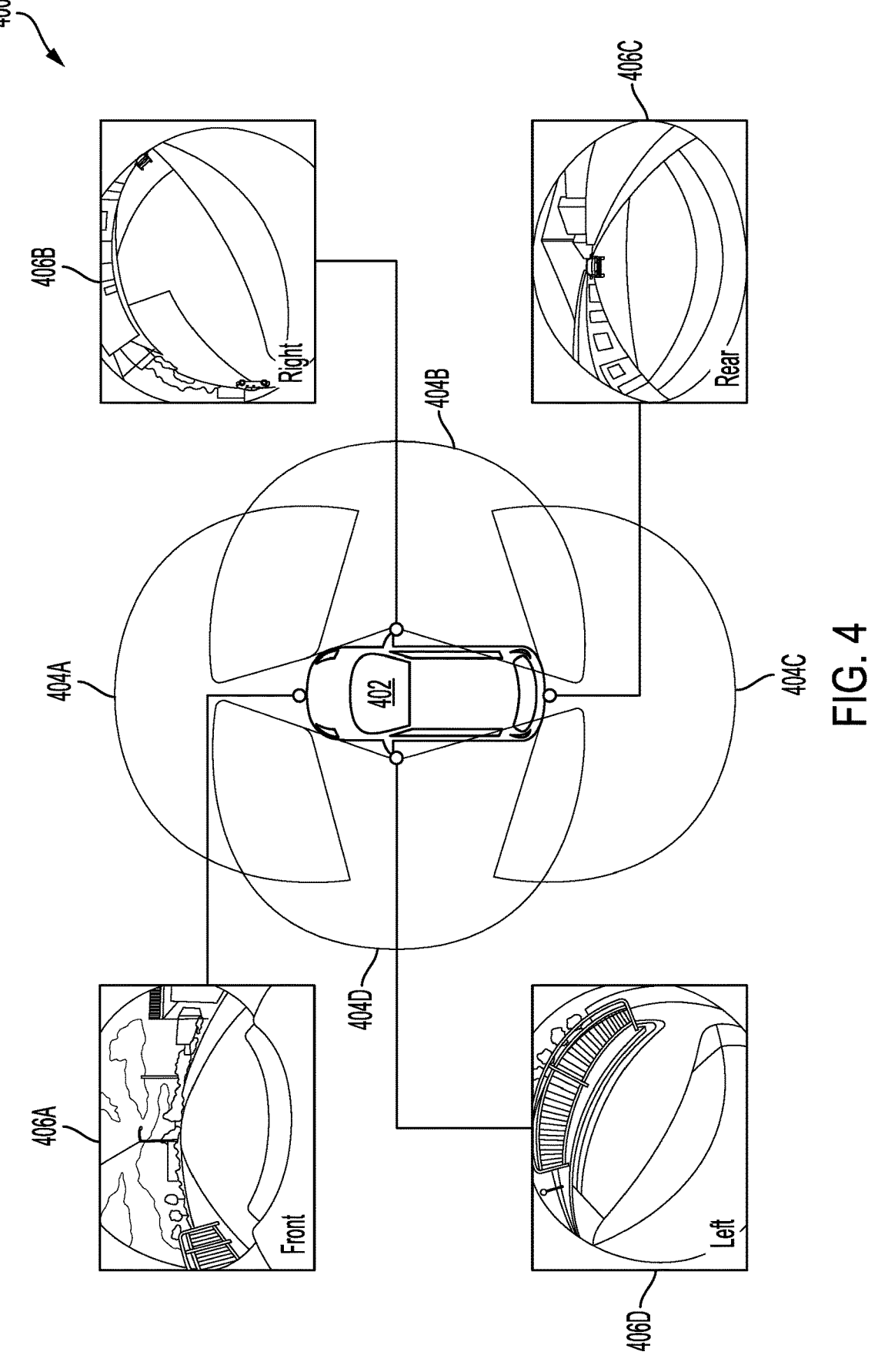
FIG. 4 is a perspective view of a motor vehicle having a plurality of fisheye cameras and views of the fisheye cameras according to some embodiments of this disclosure.

An example perspective view 400 of a motor vehicle 402 having a plurality of fisheye cameras and views of the fisheye cameras is shown in FIG. 4. The motor vehicle 402 of FIG. 4 may have four fish-eye view cameras, each with a field of view of greater than 180 degrees. The image data generated by the cameras may be used to generate a composite image, such as a bird's eye view image, of the vehicle 402. In some aspects, a vehicle may have greater than or fewer than four cameras for collecting image data for generation of a composite image of the vehicle. In some aspects, other sensors of the vehicle, such as lidar and radar sensors of the vehicle, may be used to generate a composite image including height information, such as in a height map, or motion information, such as in a motion map. A first field of view 404A of a first camera may capture image data, such as image data 406A of an environment in front of the vehicle 402. The first camera may be located at a front of the vehicle 402. The first field of view 404A may overlap with a second field of view 404B and a fourth field of view 404D. A second field of view 404B of a second camera may capture image data, such as image data 406B of an environment to a right of the vehicle 402. The second camera may be located at a right side of the vehicle 402. The second field of view 404B may overlap with the first field of view 404A and a third field of view 404C. A third field of view 404C of a third camera may capture image data, such as image data 406C of an environment behind the vehicle 402. The third camera may be located at a back of the vehicle 402. The third field of view 404C may overlap with the second field of view 404B and the fourth field of view 404D. A fourth field of view 404D of a fourth camera may capture image data, such as image data 406D of an environment to a left of the vehicle 402. The fourth camera may be located at a left side of the vehicle 402. The fourth field of view 404D may overlap with the first field of view 404A and the third field of view 404C. Thus, the field of view of the four fish-eye cameras may overlap with fields of view of adjacent fish-eye cameras allowing for generation of a composite 360-degree or bird's eye view composite image of the vehicle. Furthermore, the overlapping image data gathered by the four cameras may be used to determine depth information, such as distances between the cameras detected objects. The depth information may be used to augment a composite image with a height map, including information about heights of objects in an environment around the vehicle. In generating a composite image using image data from multiple wide-angle cameras, such as near field cameras having fish eye lenses, perception algorithms may be used to compensate for distortion inherent in image data captured by such cameras.

Images captured by cameras mounted on or integrated in a vehicle, such as fish-eye cameras, projective cameras, and other cameras, and data gathered by radar sensors, lidar sensors, and other sensors of a vehicle, may be used to generate a composite image, such as a bird's eye view composite image showing an environment around a vehicle. Such a composite may include indications of heights of objects in an environment around the vehicle, motion of objects in an environment around the vehicle, and other aspects of an environment around the vehicle. For example, a plurality of images of overlapping fields of view may be captured by a plurality of cameras as shown on the left side of FIG. 5 and used to generate a composite image including a height map, as shown on the right side of FIG. 5. FIG. 5 is a side-by-side view 500 of a plurality of images 502A-E and a height map 504A-C of a bird's eye view composite according to some embodiments of this disclosure. For example, a first image 502A of a first perspective view of an environment around a vehicle may be captured by a first camera, a second image 502B of a second perspective view of an environment around a vehicle may be captured by a second camera, a third image 502C of a third perspective view of an environment around a vehicle may be captured by a third camera, a fourth image 502D of a fourth perspective view of an environment around a vehicle may be captured by a fourth camera, and a fifth image 502E of a fifth perspective view of an environment around a vehicle may be captured by a fifth camera. In some embodiments, a plurality of depths of objects in the plurality of images may be calculated based on the image data captured by the multiple cameras. An inverse projection mapping (IPM) algorithm may be applied to the plurality of images 502A-D, such as to the plurality of depths of the objects of the plurality of images. The IPM algorithm may, for example, be used to generate a composite image, such as a bird's eye view composite image, of the environment surrounding the vehicle based on the image data. The composite image may include a height map 504A-C, as shown on the right hand side of FIG. 5. For example, the height map 504A-C of FIG. 5 may be generated from depth information computed from camera images or provided by other sensors, such as lidar sensors, as shown in FIG. 4, or another number of cameras and/or sensors. The composite image may be computed as a 2D image looking at a scene from above. As one particular example, a height map of a composite image, such as the height map 504A-C, may be generated using an inverse projection mapping, such as by using a depth image from each of a plurality of cameras to generate an array of three-dimensional world points corresponding to detected objects. In the height map 504A-C, a white portion 504A may represent a baseline height, such as a height of 0 meters above ground level, a black portion 504B may represent a height of 2 meters above ground level or greater, and the cross-hatched portion 504C may represent holes in the bird's eye view composite height map. That is, use of the IPM algorithm to generate the height map 504A-C of the composite image may result in inclusion of holes 504C in the height map, due to a lack of data indicating height information about the portion 504C of the height map. In some embodiments, a height map may include a representation of a highest point above every cell of the composite image. In the height map 504A-C of FIG. 5, there may be a large number of holes where no height, or other data, may be available at a cell of the composite image for generation of the height map 504A-C. In some embodiments, the composite image may be divided into cells, each cell having a height value, or hole, and representing approximately 40 square centimeters, while an entire grid of a composite image, such as a composite image including height map 504A-C may represent 50 square meters.

Figure 16:
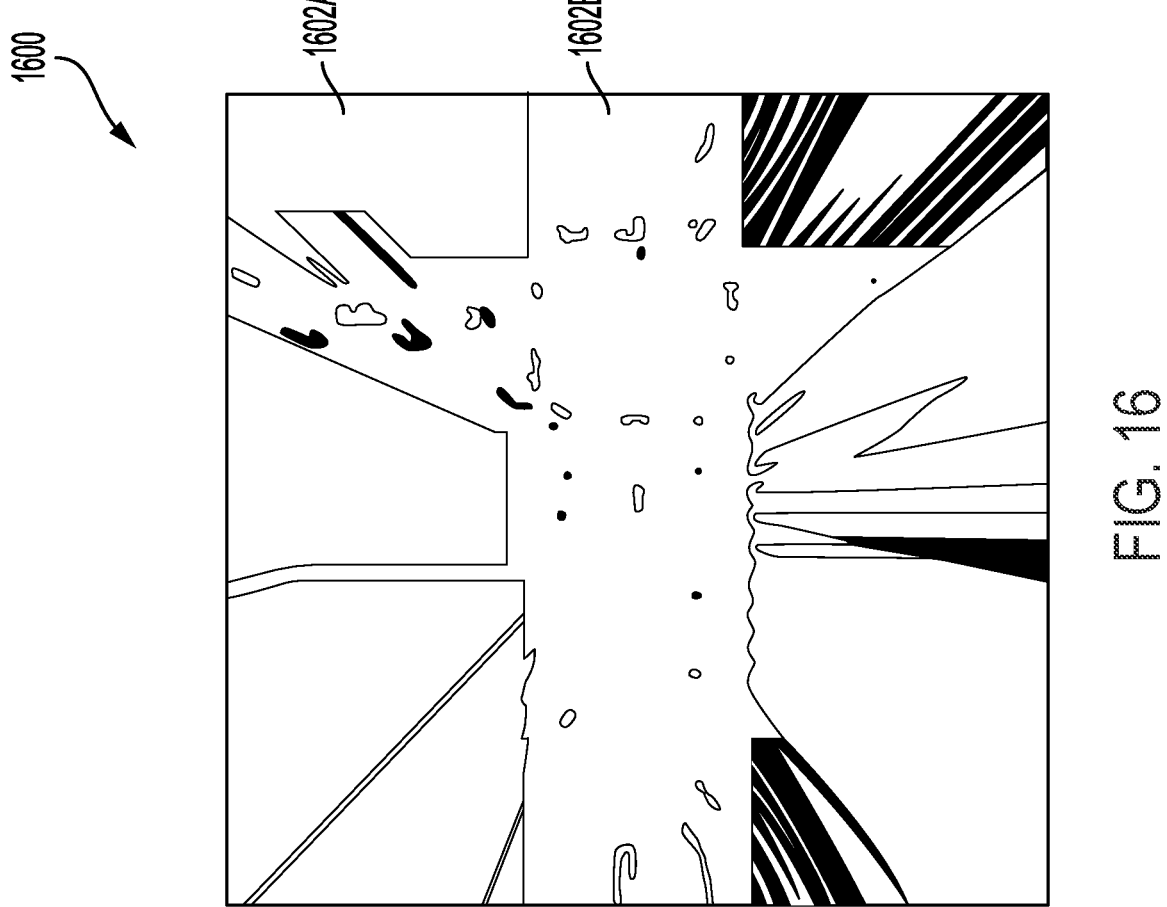
FIG. 16 is an example composite image including filled holes according to some embodiments of this disclosure.

Such holes may be filled using a hole filling algorithm, as discussed herein. For example, a composite image with a height map 1600, shown in FIG. 16, may include holes filled as discussed herein. The composite image 1600 may include first portions 1602B in white having a baseline height, such as a height of less than 2 meters above street level, while second portions 1602A, in black, may have a height of 2 meters or greater. Other height thresholds may be used for generating a height map, and, in some embodiments, different colors or other indicators may be used to indicate different heights at varying degrees of granularity. As shown in FIG. 16, the height data corresponding to the black portion 504B and white portion 504A of the height map 504A-C of FIG. 5 may be extrapolated, as described herein, to fill some of the holes 504C of FIG. 5, generating a more complete height map 1600. In the height map 1600 of the composite image, the holes have been filled, extrapolating detected objects having a height of 2 meters or greater using the hole filling techniques described herein.

Although illustrated with respect to a height map, holes may occur in other data, such as optical flow data for generating a motion map of a composite image as well. Furthermore, even in an ideal depth or height map, values may be corrupted by noise in a depth map used for inverse projective mapping. A process similar to the hole filling process described herein with respect to hole filling in a height map context may be used to mitigate noise and errors caused by noise. Such a process may, for example, be referred to as spatial denoising.

Figure 6:
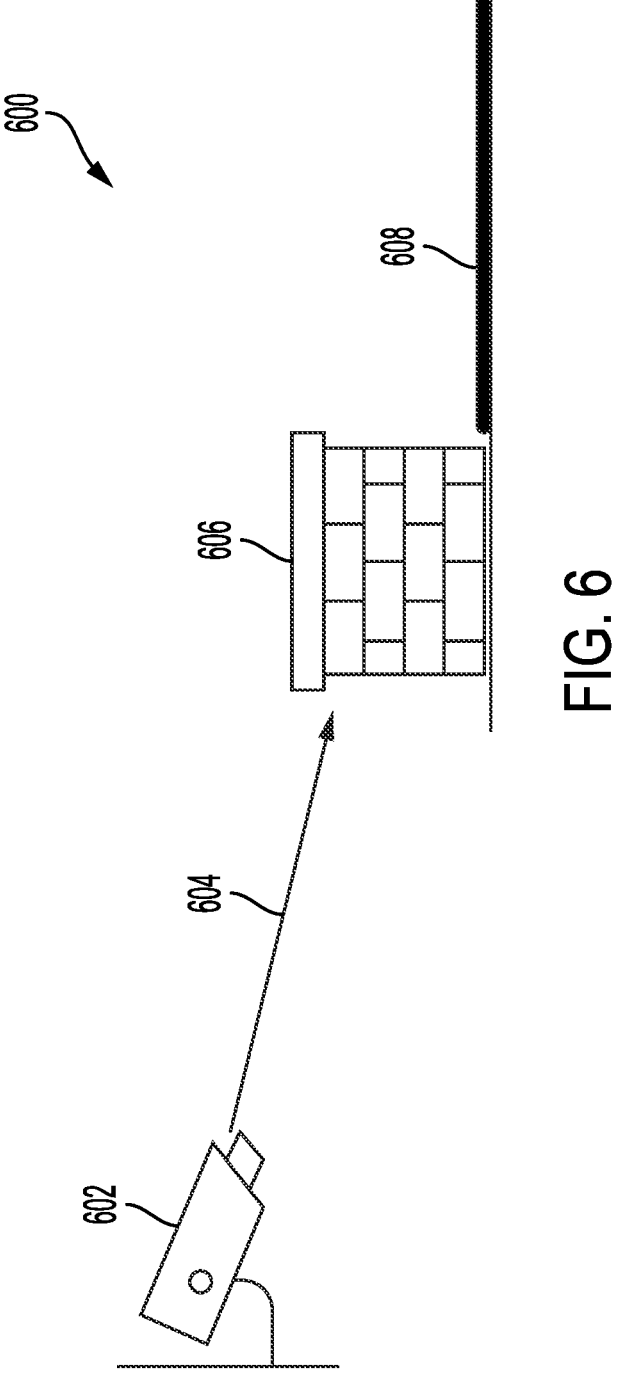
FIG. 6 is a perspective view of an example occlusion causing holes in a composite image according to some embodiments of this disclosure.
Figure 7:
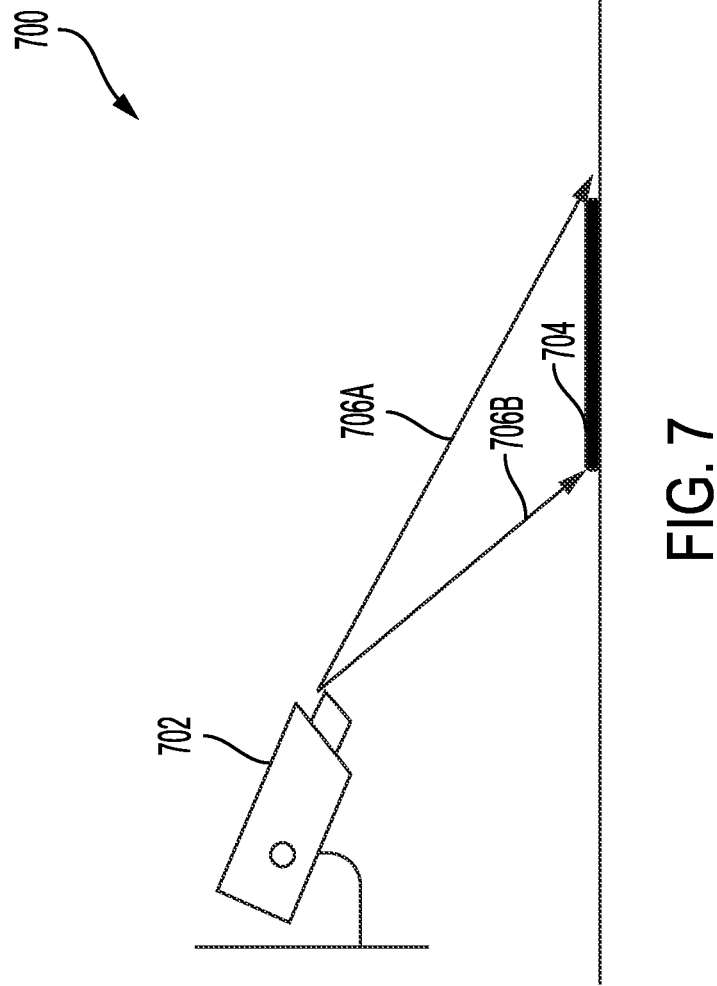
FIG. 7 is a perspective view of example angle precision defects causing holes in a composite image according to some embodiments of this disclosure.
Figure 8:
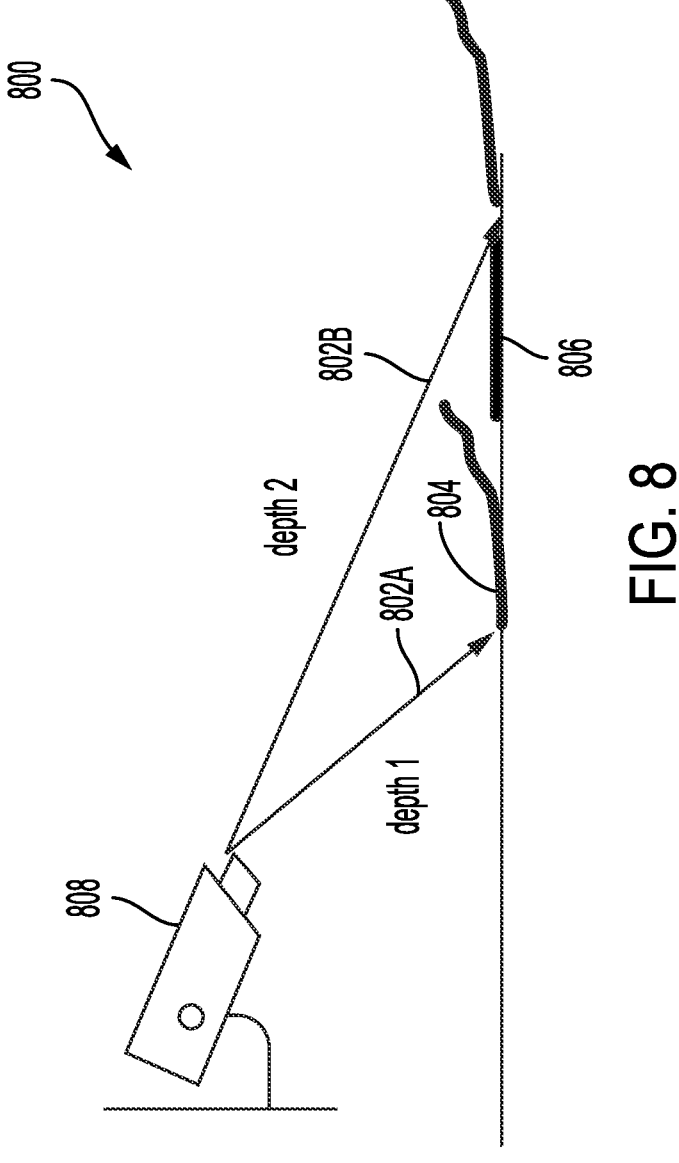
FIG. 8 is a perspective view of example depth precision defects causing holes in a composite image according to some embodiments of this disclosure.

Holes in composite images, such as in height or motion maps of composite images, generated using techniques such as IPM may be caused by occlusions, limited angular precision, and limited depth precision. FIG. 6 is a perspective view 600 of example occlusion causing holes in a composite image according to some embodiments of this disclosure. For example, as shown in FIG. 6, an object 606 may occlude a line of sight 604 from a camera 602, to a location 608 on an opposite side of the object 606 from camera 602. Thus the camera 602 may not be able to generate image data for the location 608 on the opposite side of the object 606. The lack of image data may also result in a lack of height and/or motion data for the location 608. Similar problems may apply in scenarios where objects may block views of an area from multiple cameras. Such occlusion may result in holes in a composite image generated with image data from the camera 602 and/or other cameras. As another example, FIG. 7 is a perspective view 700 of example angle precision defects causing holes in a composite image according to some embodiments of this disclosure. Limited angular precision may cause holes to appear in a composite image, such as where height, or other, data is unable to be determined due to a limited angular precision of a camera. For example, the camera 702 may be able to controlled to collect image data at a limited number of angles, such as a first angle 706A and a second angle 706B. Thus, the camera 702 may be unable to collect image data for a location 704 between the first angle 706A and the second angle 706B. As another example, FIG. 8 is a perspective view 800 of example depth precision defects causing holes in a composite image according to some embodiments of this disclosure. Limited depth precision may cause holes in a composite image due to a limited depth precision of one or more cameras used to capture image, or other, data used to generate the composite image. For example, the camera 808 of FIG. 8 may capture image data used to calculate a first depth 802A and a second depth 802B. Such depths may be used to generate height information for a height map of a composite image. Alternatively or additionally, multiple cameras may be used to capture image data for depth calculation. However, a depth may change between the resolution of image data captured for determination of the two depths and/or the resolution of the captured depths. For example, a depth at locations 804 or 806 may be different from the first depth 802A and the second depth 802B. Thus, a hole in height information for the locations 804 or 806 may be created resulting from limited depth precision.

Figure 9:
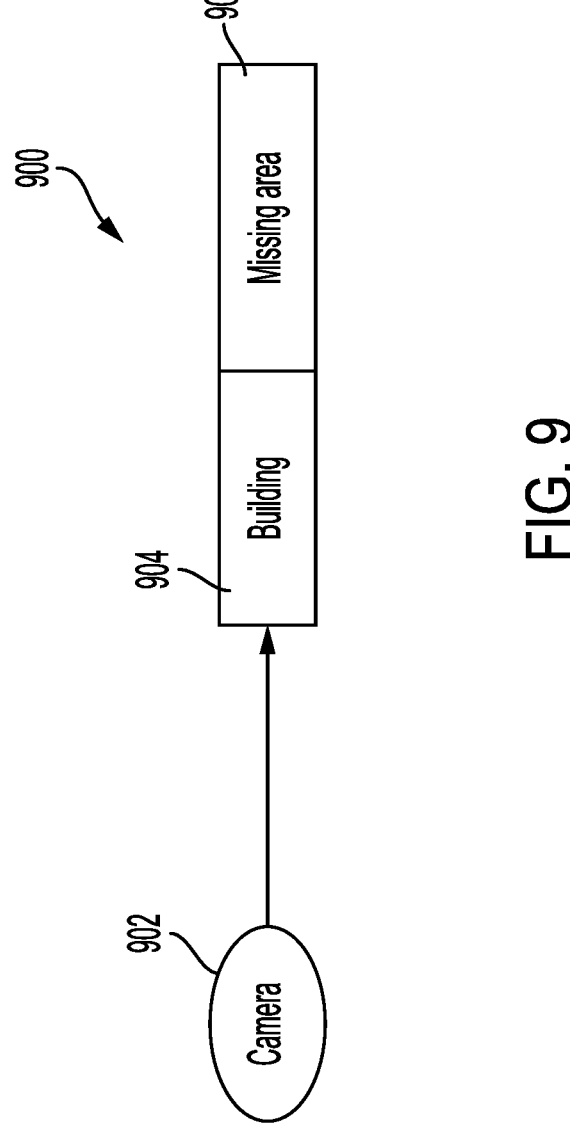
FIG. 9 is a block diagram of example occlusion causing holes in a composite image according to some embodiments of this disclosure.

FIG. 9 is a block diagram 900 showing another example of occlusion causing holes in a composite image according to some embodiments of this disclosure. A building 904 may be located between a camera 902 and an area 906. Thus, the building 904 may occlude the camera 902 from collecting image data regarding area 906, which may cause holes in a composite image using image data received from the camera 902 corresponding to the missing area 906, such as holes in height information of a height map or motion information of a motion map corresponding to the missing area 906.

Figure 10:
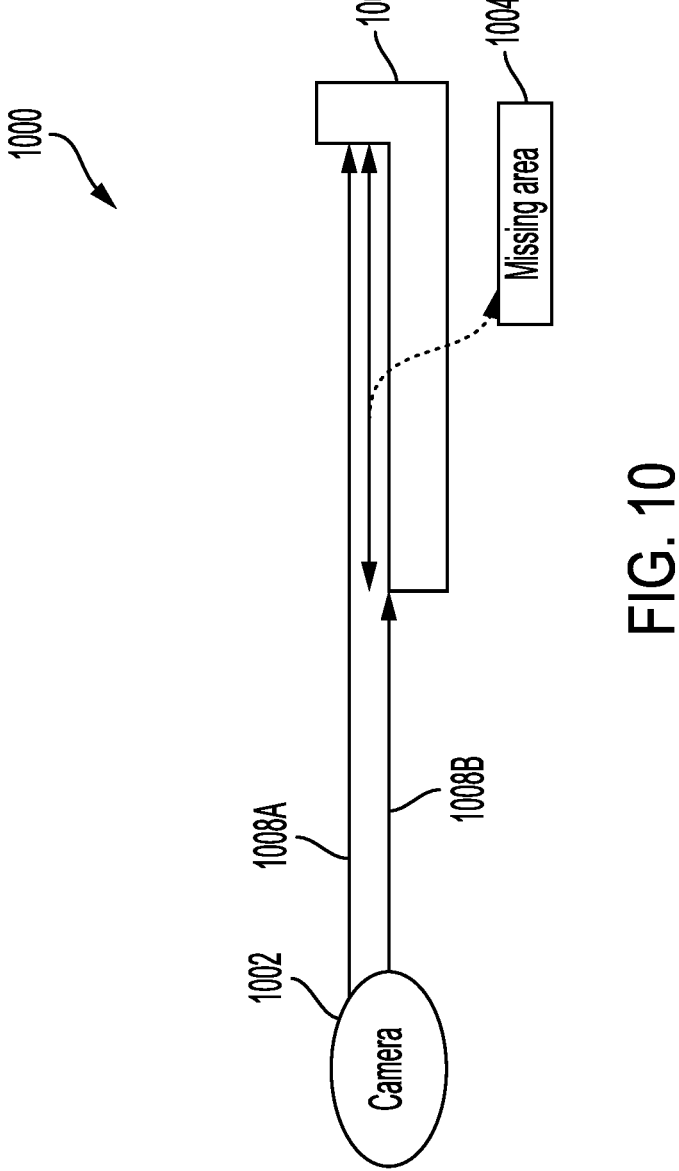
FIG. 10 is a block diagram of example angle precision defects causing holes in a composite image, according to some embodiments of this disclosure.

FIG. 10 is a block diagram 1000 of another example of angle precision defects causing holes in a composite image. A camera 1002 may be configurable to capture image data at a set number of angles, such as a first angle 1008A and a second angel 1008B. The camera 1002 may thus be unable to collect image data for an environment 1006 for angles between the first angle 1008A and the second angle 1008B resulting in holes in image data corresponding to the missing area 1004, such as holes in height data of a height map or motion data of a motion map. Thus, holes may be caused by various defects in sensing equipment and/or sets of data received from sensing equipment.

Figures 11A, 11B:
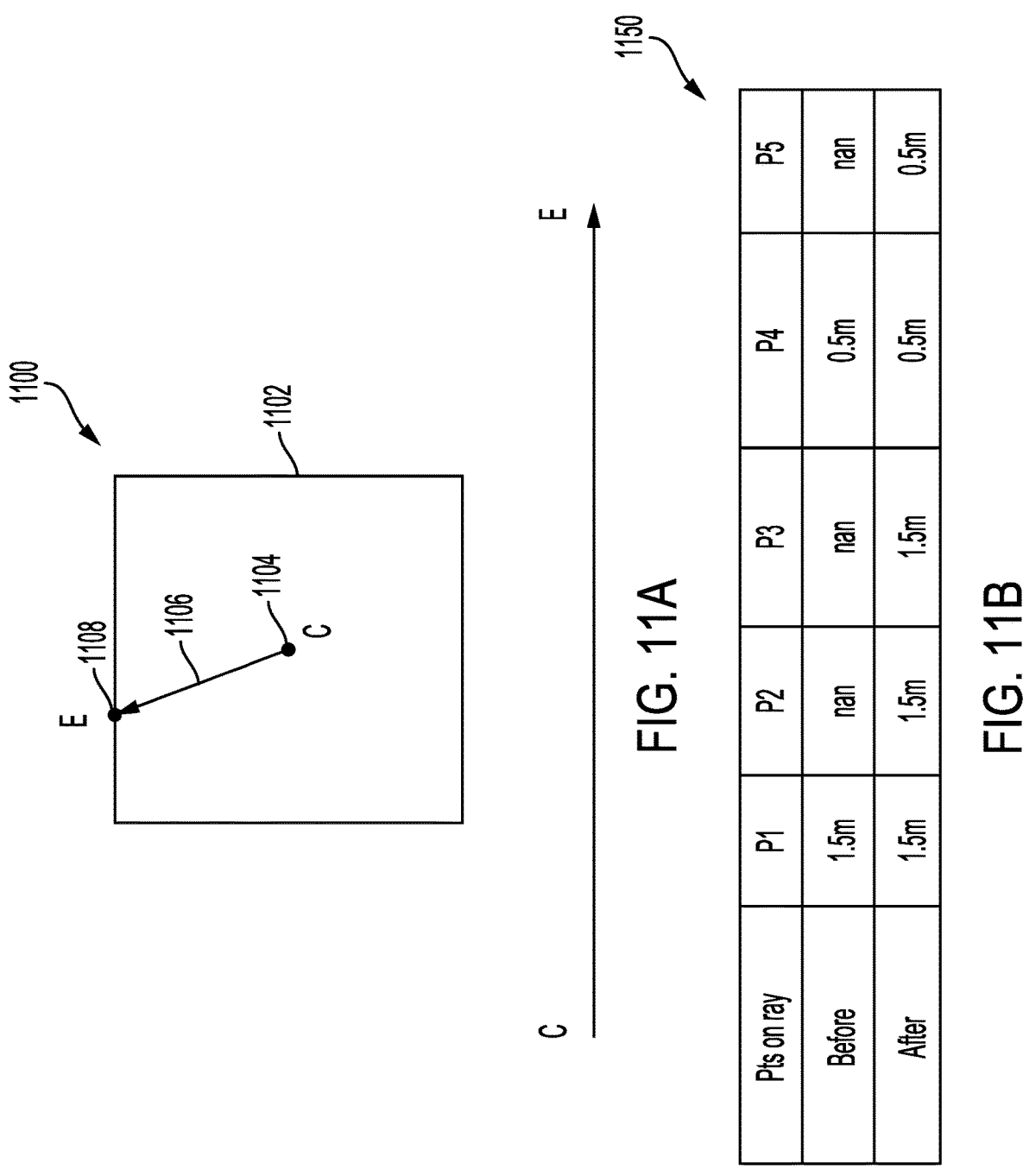
FIG. 11A is a block diagram of an example ray between a camera and an edge of a composite image according to some embodiments of this disclosure.
FIG. 11B is an example chart of example distance values assigned to grid points on a ray according to some embodiments of this disclosure.

One technique for filling holes includes determining a plurality of edges of a bird's eye view composite, such as a plurality of boundaries between cells of a bird's eye view composite. For each of multiple points on an edge, a ray from the edge to a camera used to capture image data for generating the composite image may be determined. Such rays may then be used to fill holes in composite images, such as holes in height or motion maps of composite images. FIG. 11A is a block diagram 1100 of an example ray 1106 between a camera 1104 and a point 1108 on an edge of a composite image 1102. In some embodiments, a ray 1106 between the camera 1104 and the point 1108 on the edge of the composite image 1102 may be calculated, while in other embodiments a ray between the point 1108 and the camera 1104 may be computed. In some embodiments, multiple ray between multiple cameras and multiple points of a composite image may be determined. In some embodiments, such rays may be computed during calibration of a vehicle assistance system. A composite image may be divided into a grid or set of cells. Each cell or grid point may have a corresponding height, motion, or other value. A list of grid points along the ray 1106 may be generated, and a height value, or other attribute such as a motion attribute, may be assigned to each grid point along the ray. For some grid points, data, such as height or motion data, may not be available. Such grid points may, for example, correspond to holes in the composite image. For grid points corresponding to holes, a value may be assigned corresponding to a nearest grid point along the ray for which data was available to fill the hole. In some embodiments, the assigned value may be a nearest value when moving in a particular direction along the ray. For example, a most recent value on the ray 1106 moving from the camera 1104 to the edge or boundary point 1108 may be used to fill holes along the ray until a point on the ray is encountered that is not a hole. Thus, nearby values, based on generated rays, may be used to fill holes in a composite image, such as holes in a height map or a motion map of a composite image.

FIG. 11B is an example chart 1150 of example distance values assigned to grid points on a ray, such as the ray 1106 of FIG. 11A according to some embodiments of this disclosure. Before hole filling is performed, a first point may of a ray may have a height value of 1.5 meters, a fourth point of a ray may have a height value of 0.5 meters, and second, third, and fifth points of the ray may not have height values and may correspond to holes. After hole filling is performed, the height value of the first point of 1.5 meters may be assigned to the second and third points and the height value of the fourth point of 0.5 meters may be assigned to the fifth point. A distance between a grid point of the ray for which data was present that was assigned to the hole may also be recorded. The process may be repeated for multiple rays from multiple cameras, and, in some embodiments, multiple values may be assigned to a single grid point corresponding to a hole. Then, the results for the multiple rays from the multiple cameras may be fused. For example, if multiple potential values for a grid point corresponding to a hole are present, a value may be selected based on the least distance between a grid point from which a value was copied to the hole and the hole. Thus, a value closest to the hole may be used to fill the hole.

In some embodiments, a one-time initialization may compute, for each camera used to capture information for generation of a composite image and each cell of the composite image in the camera field of view, a boundary cell location which corresponds to a ray from the camera to a point on a boundary of the composite image. Such computation may produce non-overlapping lists of composite image cells corresponding to each boundary point or pixel in the field of view of the camera. In some implementations, a 180-degree field of view may be assumed to simplify list construction.

Figure 12:
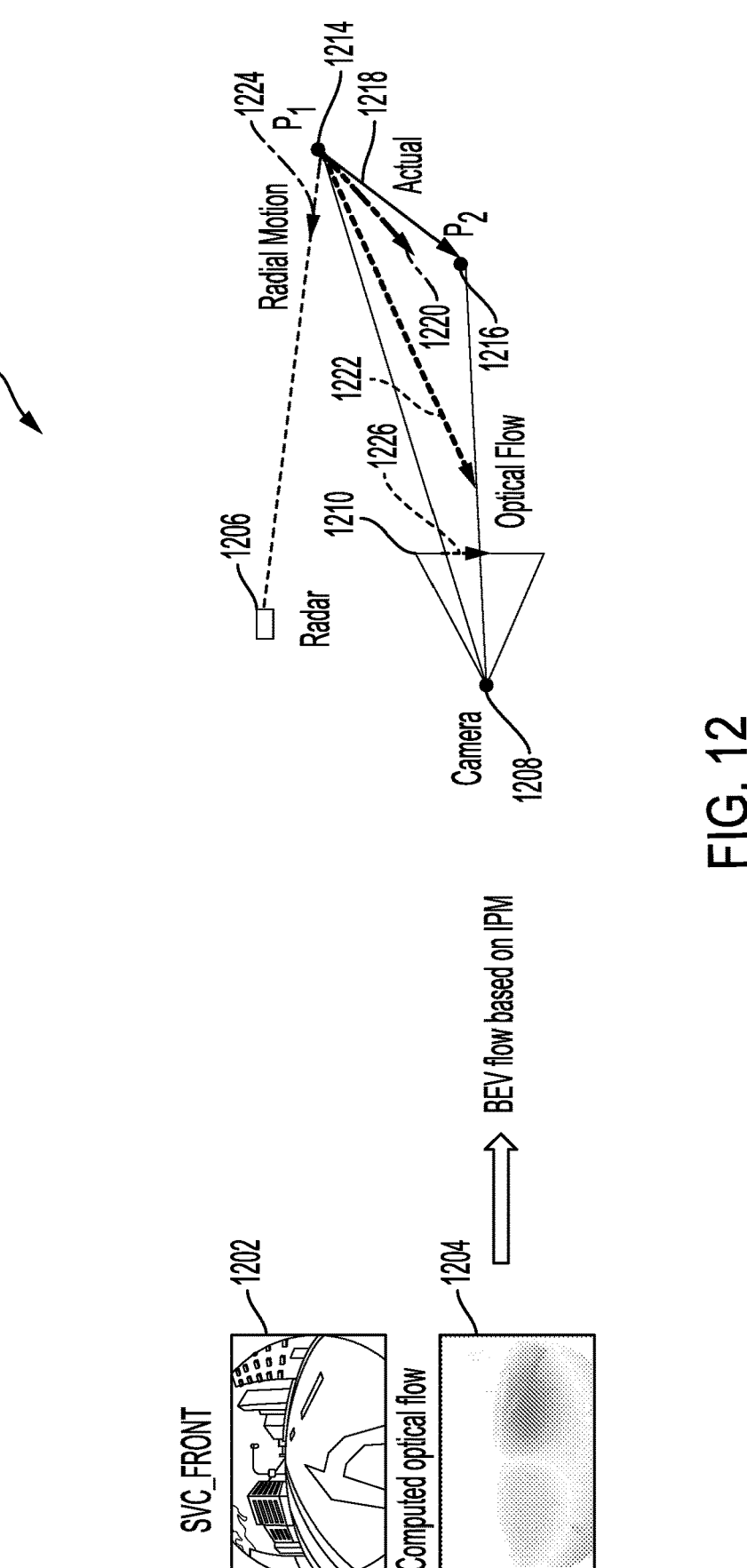
FIG. 12 is an example illustration of angles between a camera and a plurality of points for calculating optical flow and generating a motion map of a composite image according to some embodiments of this disclosure.

Motion information, such as optical flow information, may be determined from camera or other sensor data for generation of a motion map of a bird's eye view camera system. A motion map of a composite image may include one or more holes, and such holes may be filled using a similar process to the process described with respect to filling holes in a height map herein. FIG. 12 is an example illustration 1200 of angles between a camera and a plurality of points for calculating optical flow and generating a motion map of a composite image. Generation of flow for a camera may include determining a frame pair, such as a frame pair including a first image 1202 and another image of an overlapping area. The frame pair may be used to compute depths of the frames, and an optical flow may be computed based on the depths through matching one or more pixels between the frames of the frame pair. Multiple computed optical flows may be used to generate a flow map 1204 indicating motion of objects shown in the images. In some embodiments, depth information and/or an inverse projection mapping algorithm may be used to determine corresponding points in three dimensions, such as a first point X1 at time 1, a second point X2 at time 2, and a motion vector between the points X1 and X2. For example, the camera 1208 may capture an image frame with a particular object, indicated by a particular pixel pattern, being located at point 1214 at a first time and another image frame with the particular object being located at point 1216 at a second time. Information from a radar 1206 may be used to determine a radial motion vectors 1224 and 1220 associated with the first point 1214, and the second point 1216, while the camera 1208 may be used to determine the optical flow 1226 based on a vector 1222 associated with movement between the first point 1214 and the second point 1216. The radar 1206 may be used to obtain more accurate flow vectors for generation of a motion map of a composite image using doppler shift of radial motion component vectors 1224, 1220. Inverse projective mapping may be used to map the first point 1214 to X1 and the second point 1216 to X2 as two points in three-dimensional space. The motion vector 1222 may be computed as X2–X1 then mapped to a composite image as an attribute at a cell location corresponding to X1 in a grid of the composite for a motion map of the composite image similar to mapping of height values to a height map of the composite image. Thus, motion vector information may be used to generate a motion map of the composite image. Because optical flow and depth maps may be limited in ability to obtain radial motion, fusion of data from radar may be performed in addition to optical flow calculation to produce an improved flow attribute. This improved attribute may then be used as input to the hole filling process to provide flow information in the composite image motion map.

Figure 13:
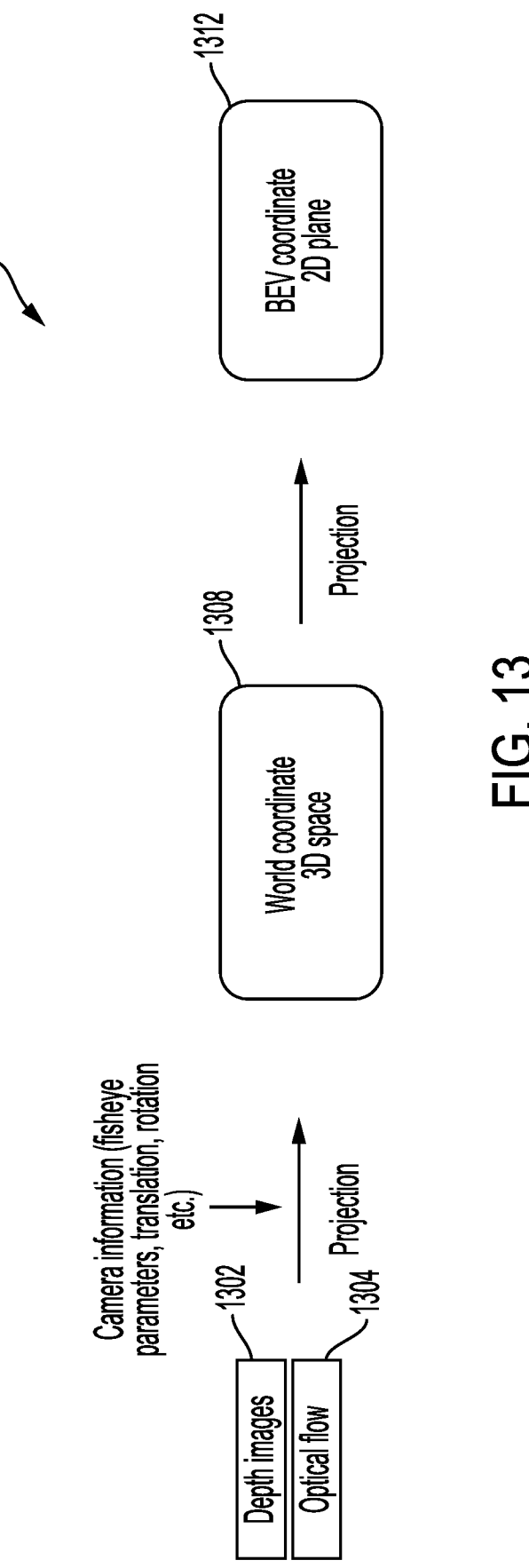
FIG. 13 is a block diagram of an example system for generation of a composite image including one or more filled holes according to some embodiments of this disclosure.

An example block diagram of a system 1300 for generation of a composite image is shown in FIG. 13. The system 1300 of FIG. 13 may, for example, generate a composite image including a height map, showing height in greyscale, and motion, showing motion in color with different colors corresponding to different degrees of motion using IPM. Depth images 1302 and/or optical flow information 1304 may be passed through a projection process at block 1308 which may apply different transforms on the image or flow information, such as fisheye transforms, translation, rotation, and other modifications to the depth images and/or optical flow data. The depth images may, for example, be images of overlapping portions of an environment around a vehicle captured by different cameras of a vehicle assistance system indicating distances between objects and the cameras, while the optical flow information may, for example, be optical flow information from cameras, radar sensors, lidar sensors, and other sensors as described herein. As one particular example, depth images and/or optical flow information may, at block 1308, be mapped onto three-dimensional space through generation of world coordinates. Thus, for depth images, for each pixel, P(row, col), in a two-dimensional depth image, a corresponding coordinate, V(x, y, z), in three-dimensional space may be found. Likewise, for optical flow information, for each point pair, P1(i, j) and P2(i+dx, j+dy), in a two-dimensional frame, a corresponding pair of points, V1 and V2, may be determined in three-dimensional space and used to calculate a motion vector, such as by subtracting V2 from V1. Another projection 1310 may be applied to project the three-dimensional coordinates determined at block 1308 onto a two-dimensional plane, At block 1312, another projection may be applied to project the three-dimensional coordinates determined at block 1308 onto a two-dimensional plane to determine coordinates for a composite image, such as height or motion map coordinates for a bird's eye view composite image may be determined. For example, at block 1312, each three-dimensional point may be projected top down on an orthographic plane. Values for each point may be scaled with given units, and the plane may be divided with multiple discrete grids. Then, for each cell of the grid of the composite image, height and/or motion may be shown in a composite image.

Figures 14A, 14B:
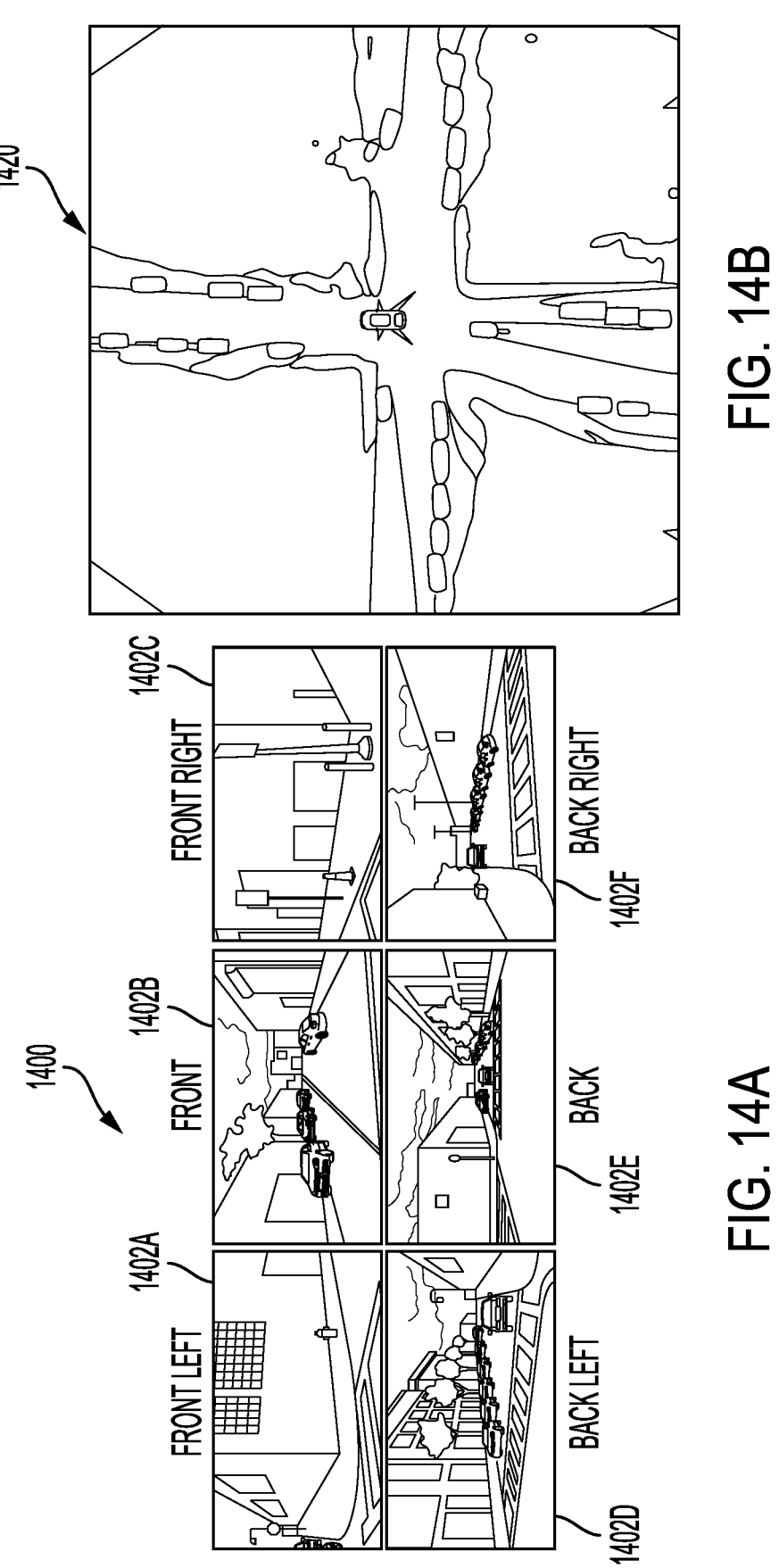
FIG. 14A is an array of example images captured by a plurality of cameras of a system for dynamic composite image generation and hole filling according to some embodiments of this disclosure.
FIG. 14B is an example composite image including a height map and a motion map according to some embodiments of this disclosure.

FIG. 14A is an array 1400 of example images 1402A-F captured by a plurality of cameras of a system for dynamic composite image generation and hole filling. For example, the images 1402A-F may be captured by different cameras of a vehicle assistance system positioned at different locations on a vehicle, as labeled in FIG. 14A. The images 1402A-F may, for example, be captured by fisheye cameras of a driving assistance system used to generate a 360-degree composite view of an environment around a vehicle. FIG. 14B is an example composite image 1420 including a height map and a motion map according to some embodiments of this disclosure. The composite image 1420 may be generated based on the image array 1400 and, in some embodiments, additional images and/or sensor data. The different outlined sections of the composite image 1420 may correspond to different heights or motions. For example, when the composite image 1420 is displayed for a user, the different outlined sections may be filled with different colors and/or shades of grey indicating different heights and/or motions. Using the methods described herein, holes in the composite image 1420 of FIG. 14B may be filled. Such a composite mage may be referred to as a semantic bird's eye view composite image.

One method of performing image processing according to embodiments described above is shown in FIG. 15. FIG. 15 is a flow chart illustrating an example method 1500 for dynamic composite image generation and hole filling according to one or more embodiments. The method 1500 may, for example, be performed by a processor of an autonomous or assisted driving system of a motor vehicle. A method 1500 includes, at block 1502, computing one or more rays of a first camera of a vehicle assistance system. Such computation may be performed for multiple cameras and/or other sensors. One or more rays from the first camera to one or more points on an edge of a field of view of a composite image may be calculated. As another example, one or more rays from one or more points on an edge of a field of view of a composite image may be calculated. Such calculation may be performed as part of a one time initialization, as described herein. A point at an edge of a field of view of a composite image may be referred to as a boundary point.

At block 1504, first image data from a first image sensor of a first camera may be received. Likewise, at block 1506, second image data from a second image sensor of a second camera may be received. A first field of view of the second image data may overlap a second field of view of the first image data, at least in part. For example, image data from the first and second cameras may show different perspective views of an environment around a vehicle. In some embodiments, the image data may include optical flow data. In some embodiments, the image data may include depth image data. In some embodiments, image data from more than two cameras may be received.

At block 1508 a composite image may be generated based on the first image data and the second image data, such as described with respect to FIG. 13. The composite image may, for example, be a bird's eye view composite image. For example, a bird's eye view composite image may be initialized per frame, such as using an inverse projection mapping. The composite image may include a motion map, indicating motion of one or more objects in the composite image, and/or a height map, indicating a height of one or more objects in the composite image. In some embodiments, cells of a composite image, such as cells of a height or motion map of a composite image, may initially be populated with attributes that are known or determined from data captured by cameras, lidar sensors, radar sensors, and other sensors. In some embodiments, generating the composite image may include applying an inverse projective mapping to the first image data and the second image data to generate a height map, and the composite image may include the height map. In some embodiments, the composite image may include a motion map, and generating the bird's eye view composite image may include generating the motion map. For example, the motion map may be generated by converting camera optical flow into flow indications of the motion map.

At block 1510, one or more holes in the bird's eye view composite image may be detected. For example, one or more holes in a motion map or one or more holes in a height map of the bird's eye view composite image may be detected. In some embodiments, detecting the one or more holes may include detecting one or more holes in the motion map or in the height map. Such detection may include detection one or more cells or grid locations of a height map and/or a motion map of the composite image for which height and/or motion data is not available based on the first image data, the second image data, and/or other sensor data.

At block 1512, the one or more holes may be filled using one or more rays of the first camera, such as the one or more rays computed at block 1502. Such filling may include looping the one or more rays to fill the holes and/or fusing the results of such looping across multiple cameras or sensors. For example, as discussed herein, such looping may include an iterative process to copy height or motion values from a known grid point on a ray from a camera to a point on an edge of a field of the bird's eye view to one or more grid points that are unknown, corresponding to holes. Likewise, a distance between a grid point from which a value was copied and one or more grid points to which the value is copied may be tracked. Then, for grid points corresponding to holes intersected by multiple rays from multiple cameras where multiple potential values are determined, a value from grid point closest to the grid point to which the value is being copied may be used. For example, filling the one or more holes may include assigning attributes, to the one or more holes, corresponding to attributes of one or more image components of the composite image adjacent to the one or more holes along the one or more rays.

In some embodiments, working arrays may be generated including fill counts, which may include information indicating distances to a grid point on a particular ray where an attribute was used to fill a particular cell. Thus, a working array may be maintained for each computed ray, and the working arrays may be compared to determine a potential value for a hole derived from a grid point closest to the hole. In some aspects, a fill count of cells that were initialized, such as cells for which motion or height data was present from image data may be set to zero, and other points corresponding to holes in the composite image may be initialized to a large count, such as a count greater than the dimensions of the composite image. In some aspects, grid points from which to derive potential values for filling a hole may be determined moving only in a distance of a ray. Thus, in some embodiments, a grid point having a value located immediately after a grid point corresponding to a hole when moving in a direction of a ray may not be used to fill a hole. In some embodiments, filling the one or more holes may be performed using one or more rays of the second camera.

In some embodiments, for each camera and each boundary point, such as each ray between each camera and each boundary point, a process for hole filling may be iterated over a list of cells of the composite image corresponding to the ray between the camera and the boundary point, such as based on a ray determined at block 1502. If a current grid point in a list for the ray does not correspond to a hole, a running fill count may be set to zero, and a running attribute used to fill holes may be set to an attribute of a current grid point. If the current grid point does correspond to a hole, the running fill count may be incremented, and the hole of the composite image corresponding to the ray for which processing is currently being performed may be filled with the running attribute. The fill count may then be set to the running fill count, and the process may move to a next grid point along the ray. At an end of the iteration of a list of the composite image corresponding to a particular ray, all grid points along the ray in the corresponding list will include attributes and fill count values. After a hole filling process is complete for each ray between the camera, or other sensor, and each grid point, the corresponding working composite image array will include fill count and attribute values for all cells in a field of view of a camera. Such a process may be repeated for each camera and/or sensor. Then, the values may be fused across cameras for each cell and/or grid point of a motion map or height map of the composite image. For example, an attribute from a corresponding ray with a lowest fill count may be selected for every grid point among multiple rays between multiple cameras and/or multiple boundary points that intersect the grid point. If a grid point has two different values, such as two different height and/or motion values corresponding to two different rays that intersect the grid point, the value from a camera, or other sensor, having a lowest index value, may be assigned to the grid point. Such assignment may allow filling of holes using data from a camera that filled the hole with the smallest fill count in the case of cells in field of view overlaps. Such operation may partially solve the occlusion problem when one camera has a view of an object or grid point but another does not. In some embodiments, filling the one or more holes may include filling one or more holes in a motion map of the bird's eye view composite.

At block 1514, spatial denoising may be applied to the bird's eye view composite, as discussed herein. Such spatial denoising may include using known two-dimensional spatial filters, such as a N×M median filter, a N×M linear filter kernel, a two-dimensional bilateral filter, and/or other filters. The strength or kernel of such a filter may be adapted spatially based on the fill count used for filling a hole or other composite image information. For example, filtering of composite image flow or motion information may be controlled via composite image height information.

In one or more aspects, techniques for supporting vehicular operations may include additional aspects, such as any single aspect or any combination of aspects described below or in connection with one or more other processes or devices described elsewhere herein. In a first aspect, an apparatus may be configured to perform operations including receiving first image data from a first image sensor of a first camera, receiving second image data from a second image sensor of a second camera, wherein a first field of view of the second image data overlaps at least a portion of a second field of view of the first image data, generating, based on the first image data and the second image data, a composite image, detecting one or more holes in the composite image, and filling the one or more holes in the composite image using one or more rays of the first camera. In some implementations, the apparatus includes a wireless device, such as a UE. In some implementations, the apparatus may include one or more processors, and a memory coupled to the one or more processors. The one or more processors may be configured to perform operations described herein with respect to the apparatus, such as by executing processor-readable code stored on the memory. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus. In some implementations, the apparatus may be a vehicle and may include a first camera and a second camera.

In a second aspect, in combination with the first aspect, the apparatus is further configured to perform operations including computing the one or more rays of the first camera.

In a third aspect, in combination with one or more of the first aspect or the second aspect, the composite image includes a height map, and wherein generating the composite image comprises applying an inverse projective mapping to the first image data and the second image data to generate the height map.

In a fourth aspect, in combination with one or more of the first aspect through the third aspect, detecting the one or more holes in the composite image comprises detecting one or more holes in the height map of the composite image, and wherein filling the one or more holes in the composite image comprises filling one or more holes in the height map.

In a fifth aspect, in combination with one or more of the first aspect through the fourth aspect, filling the one or more holes in the composite image using one or more rays of the first camera comprises assigning attributes, to the one or more holes of the composite image, corresponding to attributes of one or more image components of the composite image adjacent to the one or more holes along the one or more rays of the first camera.

In a sixth aspect, in combination with one or more of the first aspect through the fifth aspect, filling the one or more holes is further performed using one or more rays of the second camera.

In a seventh aspect, in combination with one or more of the first aspect through the sixth aspect, the apparatus may be further configured to perform operations including applying spatial denoising to the composite image after filling the one or more holes.

In an eighth aspect, in combination with one or more of the first aspect through the seventh aspect, the composite image includes a motion map, and wherein generating the composite image comprises generating the motion map.

In a ninth aspect, in combination with one or more of the first aspect through the eighth aspect, detecting the one or more holes in the composite image comprises detecting one or more holes in the motion map of the composite image, and wherein filling the one or more holes in the composite image comprises filling the one or more holes in the motion map.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a driving assistance system, comprising:

receiving first image data from a first image sensor of a first camera;

receiving second image data from a second image sensor of a second camera, wherein a first field of view of the second image data overlaps at least a portion of a second field of view of the first image data;

generating, based on the first image data and the second image data, a composite image;

detecting a hole in the composite image; and filling the hole in the composite image using a first ray of the first camera and a second ray of the second camera based on a first distance between a first grid point associated with the first ray and the hole and a second distance between a second grid point associated with the second ray and the hole.

2. The method of claim 1, further comprising:

computing the first ray of the first camera.

3. The method of claim 1, wherein the composite image includes a height map, and wherein generating the composite image comprises applying an inverse projective mapping to the first image data and the second image data to generate the height map.

4. The method of claim 3, wherein detecting the hole in the composite image comprises detecting the hole in the height map of the composite image, and wherein filling the hole in the composite image comprises filling the hole in the height map.

5. The method of claim 1, wherein filling the hole in the composite image using the first ray of the first camera and the second ray of the second camera comprises assigning attributes, to the hole of the composite image, corresponding to attributes of one or more image components of the composite image adjacent to the hole along the first ray of the first camera and along the second ray of the second camera.

6. The method of claim 1, further comprising:

applying spatial denoising to the composite image after filling the hole.

7. The method of claim 1, wherein the composite image includes a motion map, and wherein generating the composite image comprises generating the motion map.

8. The method of claim 7, wherein detecting the hole in the composite image comprises detecting the hole in the motion map of the composite image, and wherein filling the hole in the composite image comprises filling the hole in the motion map.

9. The method of claim 1, wherein filling the hole in the composite image using the first ray of the first camera and the second ray of the second camera based on the first distance between the first grid point associated with the first ray and the hole and the second distance between the second grid point associated with the second ray and the hole comprises:

determining that the first distance is less than the second distance; and assigning a value associated with the first grid point to the hole in accordance with the determination that the first distance is less than the second distance.

10. An apparatus, comprising:

a memory storing processor-readable code; and one or more processors coupled to the memory, the one or more processors configured to execute the processor-readable code to cause the one or more processors to perform operations including:

receiving first image data from a first image sensor of a first camera;

receiving second image data from a second image sensor of a second camera, wherein a first field of view of the second image data overlaps at least a portion of a second field of view of the first image data;

generating, based on the first image data and the second image data, a composite image;

detecting a hole in the composite image; and filling the hole in the composite image using a first ray of the first camera and a second ray of the second camera based on a first distance between a first grid point associated with the first ray and the hole and a second distance between a second grid point associated with the second ray and the hole.

11. The apparatus of claim 10, wherein the one or more processors are further configured to execute the processor-readable code to cause the one or more processors to perform operations including:

computing the first ray of the first camera.

12. The apparatus of claim 10, wherein the composite image includes a height map, and wherein to generate the composite image, the one or more processors are further configured to execute the processor-readable code to cause the one or more processors to perform operations including applying an inverse projective mapping to the first image data and the second image data to generate the height map.

13. The apparatus of claim 12, wherein to detect the hole in the composite image, the one or more processors are further configured to execute the processor-readable code to cause the one or more processors to perform operations including detecting the hole in the height map of the composite image, and wherein to fill the hole in the composite image, the one or more processors are further configured to execute the processor-readable code to cause the one or more processors to perform operations including filling the hole in the height map.

14. The apparatus of claim 10, wherein to fill the hole in the composite image using the first ray of the first camera and the second ray of the second camera, the one or more processors are further configured to execute the processor-readable code to cause the one or more processors to perform operations including assigning attributes, to the hole of the composite image, corresponding to attributes of one or more image components of the composite image adjacent to the hole along the first ray of the first camera and along the second ray of the second camera.

15. The apparatus of claim 10, wherein the one or more processors are further configured to execute the processor-readable code to cause the one or more processors to perform operations including:

applying spatial denoising to the composite image after filling the hole.

16. The apparatus of claim 10, wherein the composite image includes a motion map, and wherein to generate the composite image, the one or more processors are further configured to execute the processor-readable code to cause the one or more processors to perform operations including generating the motion map.

17. The apparatus of claim 16, wherein to detect the hole in the composite image, the one or more processors are further configured to execute the processor-readable code to cause the one or more processors to perform operations including detecting the hole in the motion map of the composite image, and wherein to fill the hole in the composite image, the one or more processors are further configured to execute the processor-readable code to cause the one or more processors to perform operations including filling the hole in the motion map.

18. The apparatus of claim 10, wherein to fill the hole in the composite image using the first ray of the first camera and the second ray of the second camera based on the first distance between the first grid point associated with the first ray and the hole and the second distance between the second grid point associated with the second ray and the hole, the one or more processors are further configured to execute the processor-readable code to cause the one or more processors to perform operations including:

determining that the first distance is less than the second distance; and assigning a value associated with the first grid point to the hole in accordance with the determination that the first distance is less than the second distance.

19. A non-transitory computer-readable medium storing instructions that, when executed by a processor, cause the processor to perform operations comprising:

receiving first image data from a first image sensor of a first camera;

receiving second image data from a second image sensor of a second camera, wherein a first field of view of the second image data overlaps at least a portion of a second field of view of the first image data;

generating, based on the first image data and the second image data, a composite image;

detecting a hole in the composite image; and filling the hole in the composite image using a first ray of the first camera and a second ray of the second camera based on a first distance between a first grid point associated with the first ray and the hole and a second distance between a second grid point associated with the second ray and the hole.

20. The non-transitory computer-readable medium of claim 19, further storing instructions that, when executed by a processor, cause the processor to perform operations comprising:

computing the first ray of the first camera.

21. The non-transitory computer-readable medium of claim 19, wherein the composite image includes a height map, and wherein generating the composite image comprises applying an inverse projective mapping to the first image data and the second image data to generate the height map.

22. The non-transitory computer-readable medium of claim 21, wherein detecting the hole in the composite image comprises detecting the hole in the height map of the composite image, and wherein filling the hole in the composite image comprises filling the hole in the height map.

23. The non-transitory computer-readable medium of claim 19, wherein filling the hole in the composite image using the first ray of the first camera and the second ray of the second camera comprises assigning attributes, to the hole of the composite image, corresponding to attributes of one or more image components of the composite image adjacent to the hole along the first ray of the first camera and along the second ray of the second camera.

24. The non-transitory computer-readable medium of claim 19 further storing instructions that, when executed by the processor cause the processor to fill the hole in the composite image using the first ray of the first camera and the second ray of the second camera based on the first distance between the first grid point associated with the first ray and the hole and the second distance between the second grid point associated with the second ray and the hole, by performing operations including:

determining that the first distance is less than the second distance; and assigning a value associated with the first grid point to the hole in accordance with the determination that the first distance is less than the second distance.

25. A vehicle, comprising:

a first camera;

a second camera;

a memory storing processor-readable code; and one or more processors coupled to the memory, to the first camera, and to the second camera, the one or more processors configured to execute the processor-readable code to cause the one or more processors to perform operations including:

receiving first image data from a first image sensor of a first camera;

receiving second image data from a second image sensor of a second camera, wherein a first field of view of the second image data overlaps at least a portion of a second field of view of the first image data;

generating, based on the first image data and the second image data, a composite image;

detecting a hole in the composite image; and filling the hole in the composite image using a first ray of the first camera and a second ray of the second camera based on a first distance between a first grid point associated with the first ray and the hole and a second distance between a second grid point associated with the second ray and the hole.

26. The vehicle of claim 25, wherein the one or more processors are further configured to execute the processor-readable code to cause the one or more processors to perform operations including:

computing the first ray of the first camera.

27. The vehicle of claim 25, wherein the composite image includes a height map, and wherein to generate the composite image, the one or more processors are further configured to execute the processor-readable code to cause the one or more processors to perform operations including applying an inverse projective mapping to the first image data and the second image data to generate the height map.

28. The vehicle of claim 27, wherein to detect the hole in the composite image, the one or more processors are further configured to execute the processor-readable code to cause the one or more processors to perform operations including detecting the hole in the height map of the composite image, and wherein to fill the hole in the composite image, the one or more processors are further configured to execute the processor-readable code to cause the one or more processors to perform operations including filling the hole in the height map.

29. The vehicle of claim 25, wherein to fill the hole in the composite image using the first ray of the first camera and the second ray of the second camera, the one or more processors are further configured to execute the processor-readable code to cause the one or more processors to perform operations including assigning attributes, to the hole of the composite image, corresponding to attributes of one or more image components of the composite image adjacent to the hole along the first ray of the first camera and along the second ray of the second camera.

30. The vehicle of claim 25, wherein to fill the hole in the composite image using the first ray of the first camera and the second ray of the second camera based on the first distance between the first grid point associated with the first ray and the hole and the second distance between the second grid point associated with the second ray and the hole, the one or more processors are further configured to execute the processor-readable code to cause the one or more processors to perform operations including:

determining that the first distance is less than the second distance; and assigning a value associated with the first grid point to the hole in accordance with the determination that the first distance is less than the second distance.

\* \* \* \* \*